May 23, 1972          E. R. MOLINE          3,664,685
CUSHION HITCH FOR VEHICLE BUMPERS
Filed Dec. 28, 1970
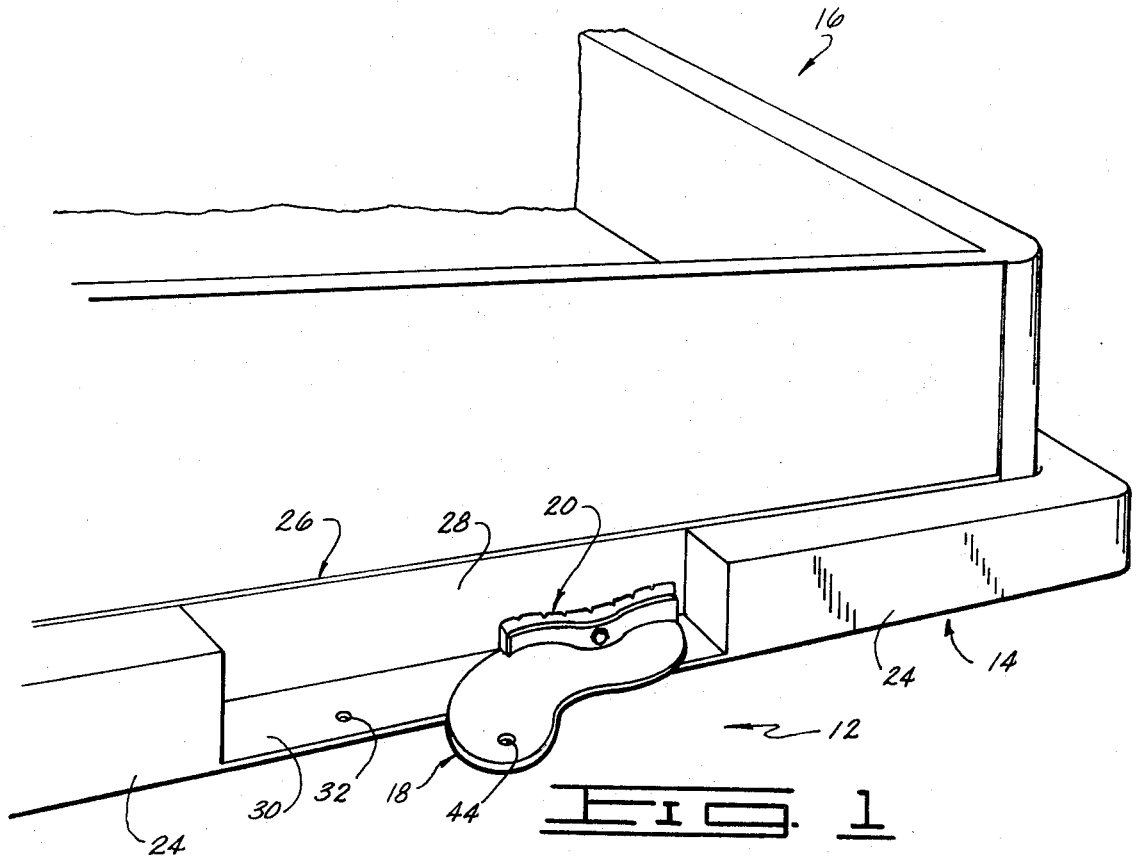
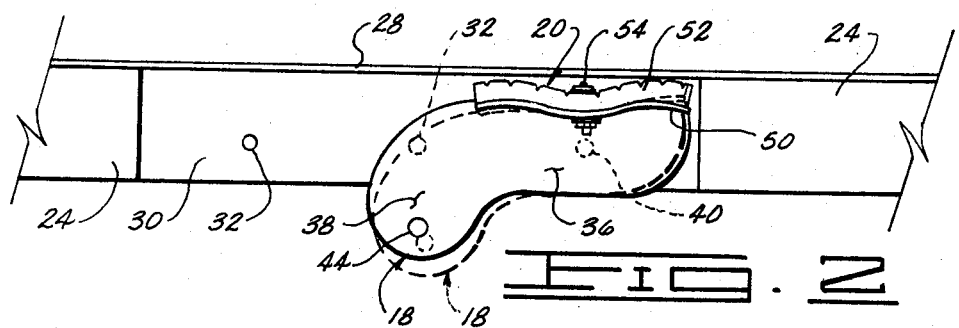
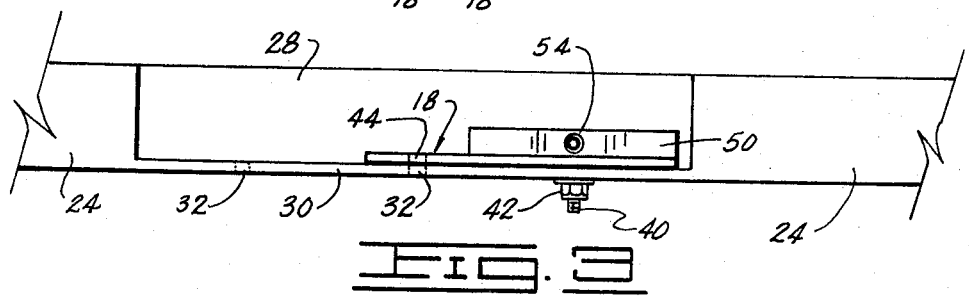
INVENTOR
ELMER R. MOLINE
BY John H. Widdowson
ATTORNEY United States Patent Office 3,664,685
Patented May 23, 1972

3,664,685
CUSHION HITCH FOR VEHICLE BUMPERS
Elmer Ray Moline, 103 E. Railroad,
Waterville, Kans. 66548
Filed Dec. 28, 1970, Ser. No. 101,612
Int. Cl. B60d 1/14
U.S. Cl. 280—486      5 Claims

ABSTRACT OF THE DISCLOSURE

A cushion hitch for use with conventional rear safety bumpers for vehicles. Such hitch has a horizontal member and an adjacent vertical portion. There is a coupling pivotally mountable with the horizontal member, and having an attachment for trailer vehicles. A cushion is attached to the coupling to contact a bumper portion when mounted on the safety bumper and when the coupling is rotated.

Many types of trailer hitches and vehicle couplings are known in the prior art for connecting vehicles or as an integral part of one vehicle for attaching it to another. Generally in these devices those which are attached permanently to a tractor vehicle are constructed so as to be substantially rigid and are rigidly attached to the vehicle. With these rigid hitches any sudden forward rearward motion of the trailer vehicle is transmitted directly to the tractor vehicle and shocks or jars it; this produces a very uncomfortable ride in the tractor vehicle. This jarring action not only produces an uncomfortable ride in the tractor vehicle but may in some extreme cases be so severe as to break the coupling or damage the trailer or tractor vehicles.

In one preferred specific embodiment of this invention a cushion hitch structure is provided having a coupling assembly and an attached resilient cushion which can be used with a conventional vehicle safety bumper adapted to reduce the amount of jarring action associated with pulling a trailer vehicle. Conventional vehicle safety bumpers have a hitch built into the center portion and have a horizontal plate member with several apertures therein and a vertical plate member at the forward end of the bumper adjoining the horizontal plate member. The coupling assembly includes a main member, pivotally mounted to the horizontal plate of the safety bumper by a mounting bolt. The main member is shaped to hold the cushion in place adjacent the vertical plate of the bumper and extend to the rear past the horizontal plate to provide an attachment for trailer vehicles or the like. The cushion is a piece of resilient material supported from the main member and positioned so as to be squeezed between the main member and the vertical portion of the safety bumper.

One object of this invention is to provide a cushion hitch structure overcoming the aforementioned disadvantages of the prior art devices.

Still, one other object of this invention is to provide a cushion hitch structure which can be used with a conventional vehicle safety type bumper and provide a device for reducing the jarring action normally associated with rigid safety type hitches when used to pull trailer like vehicles.

Yet an additional object of the cushion hitch of this invention is to provide a hitch structure for coupling trailer and trailer vehicles which has a pivoting motion and upon the pivoting motion compresses a resilient member thereby reducing the amount of shocking or jarring inter-action between the vehicles.

Still one other object of this invention is to provide a cushion hitch structure which can be easily mountable with a conventional vehicle safety bumper and which has a resilient member compressable against the safety bumper structure to absorb shocking forces.

Various other objects, advantages, and features of the invention will become apparent to those skilled in the art from the following discussion, taken in conjunction with the accompanying drawings, in which:

FIG. 1 is a perspective view of the rear end portion of a pickup truck bed having a conventional design safety bumper with the cusion hitch mounted therewith;

FIG. 2 is a top plan view of the center portion of the safety bumper showing the cushion in the unloaded position in solid lines and a normal pulling loaded position iin dashed lines; and FIG. 3 is a rear elevational view of the center position of the safety bumper and cushion hitch as shown in FIG. 1.

The following is a discussion and description of preferred specific embodiments of the cushion hitch for use with rear vehicle safety bumpers of this invention, such being made with reference to the drawings, whereupon the same reference numerals are used to indicate the same or similar parts and/or structure. It is to be understood that such discussion and description is not to unduly limit the scope of the invention.

Referring to the drawings in detail and in particular to FIG. 1, the cushion hitch structure, indicated generally at 12, is shown mounted on a conventional style rear vehicle safety bumper 14 which is mounted on a pickup truck type bed 16. The cushion hitch 12 includes a main body 18 pivotally mounted with the safety bumper and a cushion assembly 20.

Conventional safety bumpers are constructed generally like the one shown in FIG. 1. As shown the safety bumper 14 includes rectangular shaped outer end portions 24 extending to the sides of the vehicle and an integral oppositely interformed center portion 26. The center portion 26 has a vertical member 28 on the frontmost side of the bumper and a horizontal member 30 on the bottom side thereof. The horizontal bumper member 30 has a plurality of apertures 32 therethrough, usually three, (3), used to attach trailer hitch balls or other trailer vehicle couplings.

The main body 18 is preferably constructed in a plate-like form as shown in the drawings. It has a transverse portion 36 substantially aligned with the bumper 14 and an extended portion 38 projecting rearward past the rearmost edge of the bumper 14. A mounting bolt 40 is attached in the center area of the transverse portion 36 and extends downward and substantially perpendicular to the main body 18. The mounting bolt 40 provides a pivotal mounting for the cushion hitch 12; it is preferably projected through an aperture 32 in the center portion 30 of the safety bumper 14 and secured by a washer and self-locking nut 42. The nut 42 on the mounting bolt 40 is preferably tightened so the main body 18 is in firm contact with the horizontal bumper member 30 providing a somewhat restrained pivotal movement. The main body 18 is preferably substantially flat as is the horizontal bumper member 30; this permits their contact as shown and allows the main body 18 to slide over the horizontal bumper member 30. The extended portion 38 of the main body 18 has an aperture 44 therethrough to be used for mounting trailer balls, vlevis trailer couplings and the like. The cushion assembly 20 is mounted with the forwardmost edge of the transverse portion 36.

The cushion assembly 20 includes an upright support member 50 integrally attached to the transverse portion 36 and a resilient cushion member 52 on the upright support member 50. The upright support member 50 is positioned along the forward edge of the transverse portion 36 of the main body 18 and it is preferably centered relative to the mounting bolt 40. As shown in the drawings the upright support member 50 has the center thereof curved slightly toward the rear edge of the main body 18. The resilient member 52 is preferably attached to the upright support member 50 by means of a nut and a bolt, indicated at 54. The resilient member 52 is preferably a rubber-like material which will sustain repeated compressions and maintain a substantial resistance to compression. The nut and bolt attachment 54 attaching the resilient member 52 provides for easy removal and replacement of the resilient member. In practice one material has been found satisfactory for use as the resilient member 52; it is the tread portion of a vehicle tire. This type of resilient material is readily obtainable and can be easily cut to the size of the upright support member 50. Other materials can be used for the resilient member 52; however, it should be understood that practice has shown a resilient material which has the property of substantial resistance to compression is desirable.

It is to be noted and understood the cushion hitch 12 of this invention, as shown in the drawings, is constructed with the extended portion 38 of the main body 18 on the left of the transverse portion 36, but the main body 18 can be constructed with the extended portion 38 on the right of the transverse portion 36. The specific cushion hitch 12 shown is the preferred hitch; however, it is to be understood this should not limit the invention to that particular structural arrangement. The cushion hitch 12 shown in FIG. 1 is preferred for agricultural applications because a number of common implements which are likely to be pulled have the pulling tongue off-center to the left, as seen from behind, thus they must be attached to a tow vehicle off-center to the left so the implement will trail substantially centered behind the tow vehicle. With the cushion hitch 12 constructed as shown it can be mounted with the safety bumper 14 so the trailer vehicle attaching aperture 44 is positioned in the center of the safety bumper 14, as shown in FIG. 1, or off-center to the left by bolting it to the center aperture in the safety bumper 14. By moving the cushion hitch 12 to the left, it will provide the cushioning action for trailer vehicles which are pulled off of center to the left.

When a trailer vehicle or the like is attached to the cushion hitch 12 to be pulled, it is coupled with the main body 18 by using the aperture 44 in the extended portion 38. Forward movement of the tow vehicle will result in rotation of the main body 18 about the mounting bolt 40. This movement is illustrated in FIG. 3 by the main body 18 shown in dashed lines. Rotation of the main body 18 causes one end of the resilient member 52 to be compressed between the upright support member 50 and the vertical bumper member 28. Rotation of the main body 18 in the opposite direction will occur when the trailer vehicle or the like is pushed forward as in stopping; this rotation causes compression of the opposite end of the resilient member 52 between the upright support member 50 and the vertical member 28 of the safety bumper 14. Regardless of the direction of rotation of the main body 18, it compresses a portion of the resilient member 52. Compressing of the resilient member absorbs some of the shock or force which would normally be transmitted between the vehicles, thus providing a cushioning action between them. This cushioning action is very desirable especially when a trailer vehicle is pulled over a washboard like road or over rough terrain like plowed ground. In the manufacture of the cushion hitch for vehicles of this invention, it is obvious the resilient member 52 can be a material sufficiently resilient to absorb a large portion of the shocking force which, at this time, is transmitted between a towing and a towed vehicle.

In the use and operation of the cushion hitch for vehicles 12 of this invention, it is seen that same provides a structure which is easily mounted in several positions on a conventional safety bumper 14. The resilient member 52 of the structure is sufficiently compressible to absorb a large amount of the shocking force normally transmitted between towing vehicles and trailer like vehicles.

As will be apparent from the foregoing description of the applicant's cushion hitch for use with vehicle safety bumpers of this invention, relatively simple and inexpensive means have been provided to readily connect a tow vehicle and a trailer vehicle and provide for a cushioning action between them. The cushion hitch structure is easily manufactured, simple to use and usable on conventional rear vehicle safety bumpers and usable in several positions thereon.

While the invention has been described in conjunction with preferred specific embodiments thereof, it will be understood that this description is intended to illustrate and not to limit the scope of the invention, which is defined by the following claims.

I claim:

1. For a conventional rear safety bumper for vehicles having a horizontally disposed bumper member and a vertically disposed bumper member adjacent said horizontal member, a cushion hitch means comprising:
    (a) a coupling means pivotally mountable on said horizontally disposed bumper member, and having means to mount same and means to attach a trailer vehicle, and
    (b) a cushion means attached to said coupling means adapted to contact said safety bumper when said coupling means is mounted and pivoted.

2. A cushion hitch means as described in claim 1, wherein:
    (a) said coupling means has a plate-like body member,
    (b) said body member has a mounting bolt member extending therefrom positioned so as to provide for pivoting of said coupling means such that said cushion means can contact said safety bumper with rotation of said coupling means,
    (c) said cushion means is attached to an edge portion of said body member, and
    (d) said means to attach trailer vehicles or the like is an aperture through said body member positioned so as not to overlap said safety bumper.

3. A cushion hitch means as described in claim 2, wherein:
    (a) said cushion means is a resilient member,
    (b) said resilient member has an elongated shape and is adapted to contact said safety bumper with the end portions thereof, and
    (c) said mounting bolt member is positioned substantially equidistant from said end portions of said resilient member so it will compressibly contact said vertically disposed bumper member when said coupling means is rotated.

4. A cushion hitch means as described in claim 3, wherein:
    (a) said body member has a substantially L-shaped platform with the longer leg thereof aligning with said safety bumper and the shorter leg thereof extending rearward a substantial distance past the rear edge of said safety bumper, and
    (b) said cushion means is on the longest edge of said longer leg portion, said shorter leg portion has said aperture through the end portion thereof.

5. A cushion hitch means as described in claim 4, wherein:
(a) said cushion means has a resilient member support member attached along the longest edge of said longer leg extending beyond the surface of said body member,
(b) said resilient member support member is curved with the center portion thereof indented into said body member, and
(c) said resilient member substantially covers the surface of said support member and is attached thereto by a bolt and a nut therethrough said indented center portion thereof.

References Cited

UNITED STATES PATENTS

| | | | |
|---|---|---|---|
| 1,045,720 | 11/1912 | Mayer | 280—486 |
| 1,816,121 | 7/1931 | McLamarrah | 280—500 X |
| 3,397,900 | 8/1968 | Sturges | 280—486 X |

LEO FRIAGLIA, Primary Examiner

U.S. Cl. X.R.

280—500; 293—69 R